Jan. 25, 1966 W. O. STANTON 3,231,283

PHONOGRAPH PICK-UP ARM

Filed June 17, 1963 2 Sheets-Sheet 1

INVENTOR.
WALTER O. STANTON

BY

Kane, Dalsimer and Kane
ATTORNEYS

Jan. 25, 1966 W. O. STANTON 3,231,283
PHONOGRAPH PICK-UP ARM
Filed June 17, 1963 2 Sheets-Sheet 2

INVENTOR.
WALTER O. STANTON
BY
Kane, Dalsimer and Kane
ATTORNEYS

United States Patent Office 3,231,283 Patented Jan. 25, 1966

3,231,283
PHONOGRAPH PICK-UP ARM

Walter O. Stanton, Laurel Hill Road, Laurel Hollow, N.Y.

Filed June 17, 1963, Ser. No. 288,202
7 Claims. (Cl. 274—23)

This invention relates to an improved phonograph pick-up arm.

In high fidelity phonograph or sound reproduction equipment, the components thereof may be compared with the links in a chain. Each component must meet the high performance characteristics required for the overall performance or the phonograph apparatus will be impeded or impaired to the extent of failure of the component.

In the case of a pick-up arm, it is important that the arm be properly and accurately balanced in all planes; that the tracking force be subject to adjustment and that it be accurately calibrated; that the arm be of lightweight for lowest possible moment of inertia; and that the arm be mounted so that it will readily pivot about a bearing with a minimum of tracking error.

Difficulty has heretofore been encountered in providing a fully satisfactory pick-up arm having the above indicated desirable characteristcis in a device of simple and functional design which can be manufactured at a reasonable cost.

It is a prime object of the present invention to overcome the difficulties and disadvantages heretofore encountered, and to provide an improved phonograph pick-up arm of relatively simple functional design, and which is relatively inexpensive to manufacture, which at the same time may be readily adjusted so as to be balanced in all planes; which is relatively light in weight and offers a low moment of inertia; in which the tracking force is accurately calibrated and can be readily adjusted; and which is provided with an improved mounting so that it can readily pivot about its bearing support.

My invention contemplates providing an elongated, relatively rigid pick-up arm with a head for supporting a pick-up cartridge at one end, and with an adjustable counterweight at the other end, which is subject to both longitudinal and transverse adjustment so as to adjust both the longitudinal and transverse center of gravity of the tone arm. My invention also contemplates the provision of an improved bearing mounting in the form of a pivot pin and an inverted hood mounted at the center of gravity of the tone arm, and provided with a bearing seat engaging the end of the pivot pin. Between the bearing support and the head of the tone arm, I provide a tracking force adjustment slide, which is slidable longitudinally on the tone arm to adjust the tracking force at the head end of the arm.

In the accompanying drawings.

Figure 1:
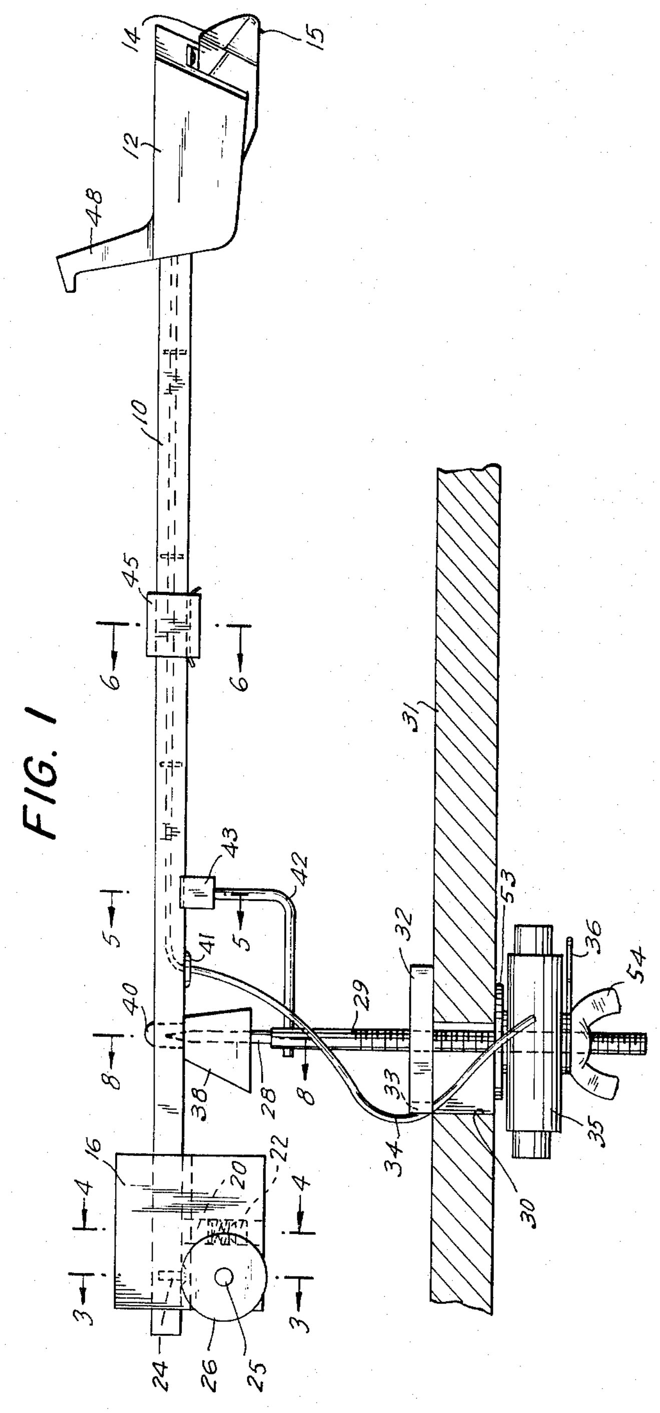
FIG. 1 is a side elevational view of a pick-up arm assembly embodying my invention, and showing the supporting base in section.
Figure 2:
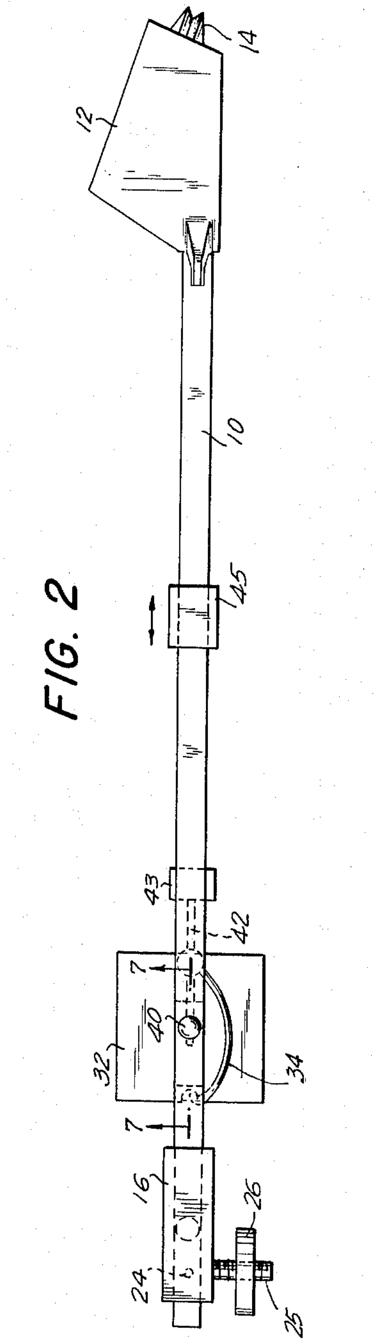
FIG. 2 is a top plan view of the tone arm assembly.
Figure 3:
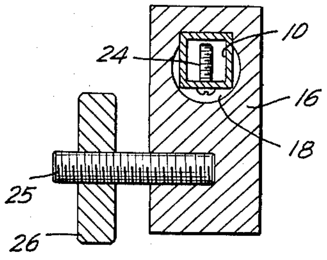
Figure 4:
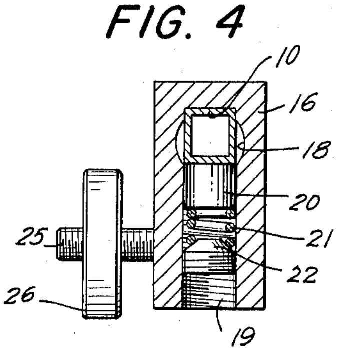
Figure 5:
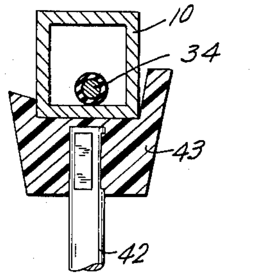
Figure 6:
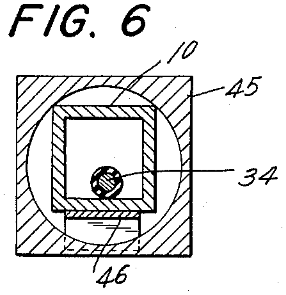
Figure 7:
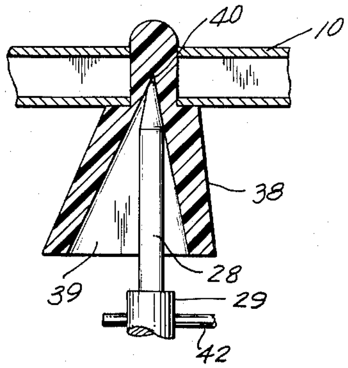

FIGS. 3, 4, 5, 6, and 8 are transverse sectional views in the direction of the arrows on the lines 3—3, 4—4, 5—5, 6—6, and 8—8 of FIG. 1; and FIG. 7 is a sectional view in the direction of the arrows on the line 7—7 of FIG. 2.

My improved phonograph pick-up arm assembly comprises essentially an elongated, straight, relatively rigid arm 10 formed at one end thereof with a head 12 for housing and accommodating a phonograph pick-up cartridge as indicated at 14. The cartridge is provided with a stylus 15 which projects downwardly thereform and is engageable with a record groove. The pick-up may be of either the monaural or stereo type.

The particular make or principal of operation of the phonograph pick-up cartridge forms no part of my present invention. Thus, the cartridge may be of the magnetic or it may be of the crystal or piezoelectric type. For high fidelity sound reproduction, I prefer to employ a magnetic cartridge.

The arm 10 is hollow or tubular in form so that the lead wires for the pick-up cartridge may extend therethrough. The cross sectional shape may vary, however, I prefer to use an arm which is square in cross section, since it is easy to prevent relative torsional movement of the counterweight and tracking force adjustment slide, hereinafter described.

Also the arm may be made of any desired material, having the requisite strength, lightness, and rigidity, such as metal or plastic material. For this purpose, I prefer to employ an aluminum extrusion.

Adjustably mounted adjacent the opposite end of the arm 10 from the head 12 is a counterweight 16, which may be longitudinally adjusted so as to properly counterbalance the weight of the opposite end of the arm, the head, and the cartridge. The counterweight may be made of any suitable material, preferably a metal, such as aluminum. It is provided with an aperture 18 extending longitudinally thereof, and of a size to have sliding engagement with the arm 10. Thus it will be seen that when a pick-up cartridge is assembled with the head 12 and the pick-up arm is properly mounted on its bearing support. The slide 16 is adjusted longitudinally of the arm so as to adjust or balance the longitudinal center of gravity.

I also provide suitable means for retaining the counterweight 16 in longitudinally adjusted position. Thus, I provide the counterweight 16 with an internally threaded bore 19 accommodating a small slide 20 which is resiliently urged into frictional engagement with the lower surface of the arm by helical spring 21 held in adjusted position by the small adjusting screw 22. Thus, the frictional engagement between the slide 20 and the arm 18 may be varied by adjusting the screw. The screw is adjusted so that the slide exerts sufficient frictional force against the arm to retain the counterweight in any desired adjusted position while at the same time permitting intentional adjustment thereof when sufficient force is applied.

I also may provide suitable stop means, such as the screw 24 mounted near the end of the arm 10 so as to prevent accidental shifting of the counterweight from the end of the arm. It will be appreciated that when the slide 20 engages the head of screw 24 it will resist further shifting of the parts in a direction of separation.

I also provide counterweight 16 with transversely shiftable means for adjusting the transverse center of gravity of the pick-up arm assembly. For this purpose, I provide an externally threaded stud mounted in one side of the counterweight 16, as shown, and projecting laterally therefrom. Threaded to the stud 25 with a tight friction fit is the adjustable weight 26. By rotating the weight 26 in a clock-wise direction, it is shifted inwardly toward the side of the counterweight; by rotating it in the opposite direction, it is shifted outwardly away from the counterweight. Because of the tight fit, the weight will remain in adjusted position against accidental displacement. Thus, it will be seen that the transverse center of gravity of the pick-up arm assembly may be readily adjusted by the rotatable weight 26.

It will accordingly be seen that the counterweight 16 provides for both longitudinal and transverse adjustment of the center of gravity of the tone arm.

I also provide improved bearing mounting means for the pick-up arm adjacent its desired adjusted center of gravity. Thus, I provide a pivot pin 28, having a tapered upper end and having means for vertically mounting it. The mounting means for the pivot pin comprises the externally threaded stud 29 of larger diameter than the pivot pin and suitably secured thereto. The stud 29 is adapted to extend through an opening 30 formed in the base 31 for the turntable. The opening 30 is preferably made oversize, as shown, so that the relative position of the stud 29 may be shifted to properly mount the tone arm. To hold the stud in place, I provide suitable threaded clamping members, which are threaded to the stud on opposite sides of the base 31. Thus, on the upper side of the base, I provide the rectangular plate 32, having a notch or aperture 33 formed in one side thereof, as shown in dotted lines, for accommodating the cable 34 of lead wires leading to and from the pick-up cartridge 14.

On the lower side of the base 31, I preferably provide a washer 53 and a wing nut 54, which may be tightened to clamp the base 31 between the plate 32 and washer 33, thus securely holding in place the stud 29 and pivot pin 28. Between the wing nut 34 and the washer 33, I may support the amplifier connecting plug 35 and a ground lug 36, whereby a ground connection may be readily made.

The lead wires of cable 34 connected to pick-up cartridge 14 are suitably connected to the connecting plug 35 and the plug, in turn, may be suitably connected to the amplifier or preamplifier in the usual manner.

The pivot pin 28 engages with an inverted hood 38 suitably mounted in the pick-up arm, as shown. The hood 38 may be made of a suitable plastic material, having good bearing characteristics, such as nylon, polyethylene, polystyrene, or a polymer or copolymer of vinyl chloride.

Figure 8:
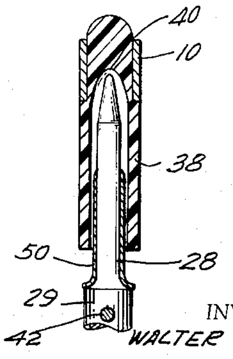

It is formed with an opening at its lower end, as shown at 39, which is relatively elongated in a longitudinal direction, and which is just wide enough to have a free fit with the pivot pin 28, as shown most clearly in FIG. 8. Thus, the tone arm is free to tilt or pivot longitudinally as it is lowered into engagement with the record, or elevated to a position of rest. However, it is prevented from having undue tilting in a lateral or transverse direction. The opening 39 tapers longitudinally in an upward direction, terminating in a closed upper end 40, which serves as a bearing seat for the upper end of pivot pin 28 when the parts are assembled as shown in FIGS. 7 and 8.

The inverted hood 38 is suitably mounted in the arm 10 adjacent its desired longitudinal and transverse adjusted center of gravity. Thus, the lower and upper walls of the arm are pierced as shown, forming an aperture extending therethrough, in which the reduced upper end portion of the inverted hood is tightly fitted and suitably secured in place, as by cementing (see FIGS. 7 and 8).

Between the hood 38 and the head end 12 of the arm, I preferably provide an aperture, as shown at 41, through which the cable of lead wires may be extended so as to provide electrical connection between the magnetic pick-up and the plug 35. In extending cable 34 through the notch in plate 32, care should be taken that the cable is sufficiently free, not to interfere with the pivoting motion of the tone arm assembly.

I also provide a suitable arm rest mounted on the pivot pin assembly. Thus, as shown in FIG. 1, I preferably provide a bracket 42 mounted in the stud 29 and extending outwardly therefrom and thence at right angles upwardly where it is provided with the supporting cradle or rest 43, of a size and shape to accommodate the arm 10 thereon. The relative height of the rest 43, as compared with the bearing mounting, is such that the pick-up arm 10 is maintained in relatively horizontal position when it is supported on the arm rest, as shown in FIG. 1.

I also provide my improved pick-up arm with suitable means for adjusting the tracking force. Thus, mounted on arm 10 between the head portion 12 and the bearing mounting is the slide member 45 which may be shifted or adjusted longitudinally of the arm. The slide member 45 may be made of suitable material, such as metal or plastic, and for this purpose I prefer to employ aluminum.

The side member has an opening extending longitudinally therethrough large enough to provide a sliding fit between the member and the arm, as shown most clearly in FIG. 6. To retain the slide member 45 in relatively adjusted position and to prevent relative rotation between the arm and slide member, I provide the leaf spring member 46 mounted in the lower portion of the slide member and extending upwardly and through the opening into resilient engagement with the lower portion of the arm 10, also as shown most clearly in FIG. 6. The frictional engagement between the leaf spring member 46 and the arm is such as to retain the slide in relatively adjusted position against accidental displacement.

In assembling my improved pick-up arm, a pick-up cartridge is first mounted in the head 12 in the usual manner and the terminals of the cartridge are suitably connected to the lead wires in cable 34. An oversize aperture 30 is then drilled in the base of the turntable, as shown, in a suitable position so that when the tone arm is assembled it can be adjusted so that the stylus overhangs the turntable center by approximately $^{17}/_{32}''$.

The cable 34 is extended downwardly through the aperture 30 and the plate 32 is threaded to the stud 29 to the approximate desired height. The washer, connection plug, ground lug and wing nut are inserted beneath the base 31 and after the stud is inserted through the aperture they are applied thereto as shown. The plate 32 is adjusted to the proper relative height with respect to stud 29 so that the arm 10 is approximately in horizontal position when the stylus tracks the record groove.

With the inverted hood 38 assembled over the pivot pin, as shown, the stud 29 is then adjusted laterally in aperture 30, as previously explained, so that the stylus tip overhangs the turntable center by approximately $^{17}/_{32}''$. The wing nut 34 is then tightened to firmly hold the assembly in the properly adjusted position.

The tracking force adjusting slide 45 is then shifted all the way to the left, as viewed in FIG. 1, and the counterweight 16 is adjusted longitudinally so as to properly counterbalance the assembly longitudinally. The rotatable weight 26 is also adjusted transversely so as to properly counterbalance the arm assembly transversely. Thereafter, the slide 45 is shifted to the right, as viewed in FIG. 1, so as to impart the proper tracking force to the head end of the assembly. The cartridge manufacturer usually designates the preferred tracking force. If desired, calibrations may be provided on the arm 10 so as to indicate tracking forces of one, two, and three ounces. Slide 45 is shifted to the calibration indicating the desired tracking force.

In "cueing" or shifting the tone arm from record-playing position to a position of rest, a forward pressure is exerted on the handle portion 48 of the head 12, and the arm raised upwardly into and out of position.

While in use, undue lateral tilting of the arm is prevented due to the relatively close clearance between pivot pin 28 and the sides of opening 39 in head 38. If desired, the clearance between the pivot pin and the head may be further reduced by assembling a sleeve 50 around the pivot pin, as shown in FIG. 8.

It will thus be seen that I have provided an improved pick-up arm assembly, in which the arm may be readily balanced in all planes by simple adjustments; in which the tracking force is accurately calibrated and may be readily adjusted; which is of lightweight so as to cause a relatively low moment of inertia; and which is provided with an improved bearing mounting, whereby the arm may readily pivot.

Modifications may be made in the illustrated and described embodiment of my invention without departing from the invention as set forth in the accompanying claims.

I claim:

1. An improved phonograph pick-up arm assembly comprising: an elongated, straight, relatively rigid arm with a head for supporting a pick-up cartridge adjacent one end; a counterweight mounted on said arm adjacent the other end for non-rotational slide movement longitudinally of the arm for adjusting the longitudinal center of gravity of said arm assembly, said counterweight including means having threaded adjustment transversely of the arm for adjusting the transverse center of gravity of said arm assembly; a bearing mounting for said assembly including a pivot pin, having means for mounting it in vertical position and also an inverted hood having a depending apron extending downwardly on all sides thereof mounted on said arm adjacent the desired transverse and longitudinal center of gravity of said arm assembly and formed with a longitudinally elongated opening at its lower end, tapering upwardly to a closed upper end disposed above the vertical center of gravity of said arm assembly, with the said upper end serving as a bearing seat for the upper end of the pivot pin, with the opening in the hood being sufficiently elongated at its lower end in a direction longitudinally of the arm so that the arm may tilt longitudinally and being just wide enough to freely accommodate the pivot pin so as to prevent transverse tilting of the pick-up arm assembly; and tracking force adjustment means mounted on said arm between the said hood and the head for sliding adjustment longitudinally of the arm to adjust the tracking force at the head end of the arm.

2. An improved phonograph pick-up arm assembly as set forth in claim 1, in which the arm is formed with a vertical opening adjacent the desired adjusted center of gravity of the pick-up arm assembly and the inverted hood is mounted therein.

3. An improved phonograph pick-up arm assembly as set forth in claim 1, in which the counterweight and the tracking force adjustment means are restrained against torsional movement relative to the arm.

4. An improved phonograph pick-up arm assembly as set forth in claim 3, in which the arm is rectangular in cross section and the counterweight and the tracking force adjustment means each has means bearing against one of the flat faces of the arm to prevent relative torsional movement thereof.

5. An improved phonograph pick-up arm assembly as set forth in claim 1, in which the counterweight and the tracking force adjustment means each have means resiliently pressed against a surface of the arm so as to retain them in adjusted position.

6. An improved phonograph pick-up arm assembly as set forth in claim 1, in which the transverse adjusting means comprises a laterally projecting threaded stud with a member having tight threaded engagement therewith for providing adjustment transversely of the arm assembly.

7. An improved phonograph pick-up arm assembly as set forth in claim 1, in which the pivot pin is provided with an arm rest mounted thereon and engageable with the arm between the hood and the head so as to provide support thereto when the arm is not in use.

References Cited by the Examiner

UNITED STATES PATENTS

| | | | |
|---|---|---|---|
| 2,551,506 | 5/1951 | Rockwell | 274—23 |
| 2,604,326 | 7/1952 | Lynch | 274—23 |
| 2,993,698 | 7/1961 | Stanton | 274—23 |
| 3,028,161 | 4/1962 | Siebert | 274—23 |
| 3,051,494 | 8/1962 | Walton | 274—23 |
| 3,167,317 | 1/1965 | Wilson | 274—23 |

NORTON ANSHER, *Primary Examiner.*